(12) United States Patent
Marin

(10) Patent No.: US 9,398,793 B2
(45) Date of Patent: Jul. 26, 2016

(54) CLUTCH CASE WITH OUTER MOUNTING PLATE FOR HOLDING A SMARTPHONE

(71) Applicant: Fiona Kotur Marin, New York, NY (US)

(72) Inventor: Fiona Kotur Marin, New York, NY (US)

(*) Notice: Subject to any disclaimer, the term of this patent is extended or adjusted under 35 U.S.C. 154(b) by 213 days.

(21) Appl. No.: 14/080,637

(22) Filed: Nov. 14, 2013

(65) Prior Publication Data

US 2015/0129095 A1   May 14, 2015

(51) Int. Cl.
| | |
|---|---|
| *A45C 9/00* | (2006.01) |
| *A45C 13/02* | (2006.01) |
| *A45C 11/00* | (2006.01) |
| *H04M 1/04* | (2006.01) |
| *A45C 3/06* | (2006.01) |
| *A45C 15/00* | (2006.01) |

(52) U.S. Cl.
CPC . *A45C 9/00* (2013.01); *A45C 13/02* (2013.01); *A45C 3/06* (2013.01); *A45C 15/00* (2013.01); *A45C 2009/007* (2013.01); *A45C 2011/002* (2013.01); *H04M 1/04* (2013.01)

(58) Field of Classification Search
CPC ............ A45C 9/00; A45C 1/02; A45C 11/00; A45C 13/005; A45C 2011/002; A45C 13/02; A45C 3/06; A45C 15/00; A45C 2009/007; H04M 1/04; H04M 1/21; G06F 1/1626; H04B 1/3888
See application file for complete search history.

(56) References Cited

U.S. PATENT DOCUMENTS

| | | | | | |
|---|---|---|---|---|---|
| 979,763 | A | * | 12/1910 | Hollis ...................... | A45C 3/06 150/112 |
| 1,101,490 | A | * | 6/1914 | Geissler ................... | A45C 3/06 150/117 |
| 1,361,761 | A | * | 12/1920 | Gay ......................... | A45C 3/00 150/109 |
| 2,081,085 | A | * | 5/1937 | Bowen ..................... | A45C 3/06 150/106 |
| 2,765,016 | A | * | 10/1956 | Parsegian ............... | A45C 13/06 150/101 |
| 3,352,391 | A | * | 11/1967 | Vaughan ................. | A45C 3/06 190/111 |
| D383,897 | S | * | 9/1997 | Hare ............................. | D3/260 |
| 6,788,919 | B2 | * | 9/2004 | Watanabe ............... | H04M 1/21 379/434 |
| 7,431,161 | B2 | * | 10/2008 | Carlino ................... | B65D 69/00 132/316 |
| D688,655 | S | * | 8/2013 | Rey-Hipolito ....... | H04R 1/1033 D14/250 |
| D700,599 | S | * | 3/2014 | Kim ........................... | D14/250 |
| 8,833,379 | B1 | * | 9/2014 | Kaplan ................... | A45D 33/26 132/287 |
| 2003/0164217 | A1 | * | 9/2003 | Huang ................... | A45C 13/08 150/127 |
| 2011/0077061 | A1 | * | 3/2011 | Danze ................... | H04M 1/185 455/575.1 |
| 2013/0148839 | A1 | * | 6/2013 | Stevinson ............ | H04R 1/1083 381/384 |

* cited by examiner

*Primary Examiner* — Tri Mai
(74) *Attorney, Agent, or Firm* — Corridor Law Group, P.C.

(57) ABSTRACT

A clutch case comprises a pair of clamshell members hinged together at a bottom edge thereof such that the members, when closed, form an interior chamber for containing objects and, when open, provide access to the interior chamber. The clutch case also includes a smartphone mounting plate to hold a smartphone. The mounting plate is configured so that both any physical buttons as well as the touch screen of the smartphone will be useable when it is still attached to the clutch case. The mounting plate also allows a user to utilize the smartphone's camera while it is still held in the mounting plate.

8 Claims, 6 Drawing Sheets

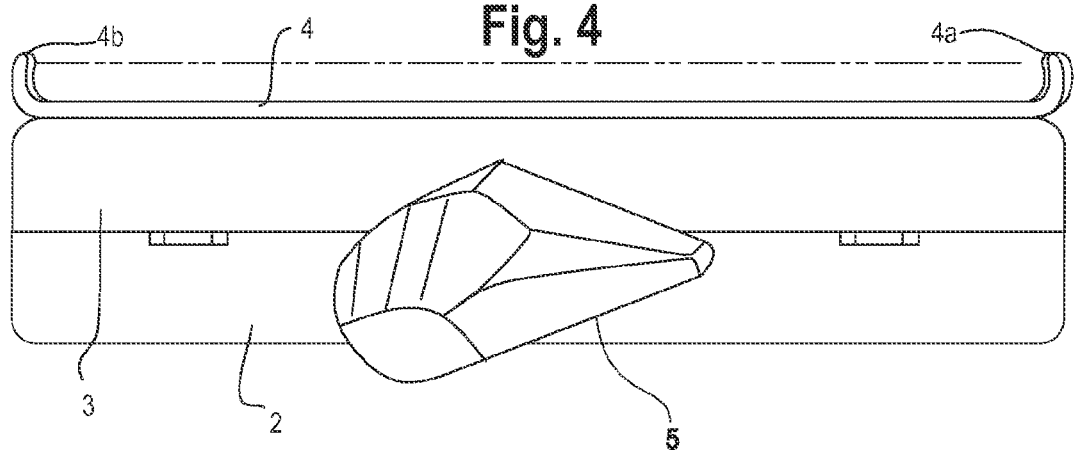
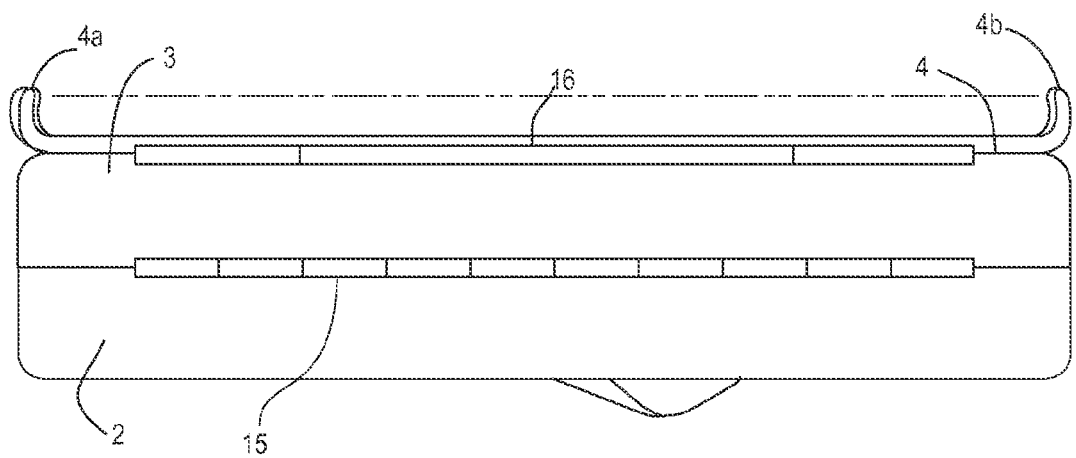

CLUTCH CASE WITH OUTER MOUNTING PLATE FOR HOLDING A SMARTPHONE

FIELD OF INVENTION

The present invention relates to fashion accessories. In particular, the present invention relates to a clutch case, otherwise known as a minaudiere, for containing cosmetics or other personal objects, and is intended to be carried as a handbag. The clutch case is configured to hold a smartphone, so that a user can operate certain features of the phone without removing the phone from the clutch case.

BACKGROUND OF THE INVENTION

Fashion accessories are a form of personal expression. In the case of handbags, not only must the piece serve the functional purpose of containing and conveniently transporting personal items such as cosmetics and credit card holders, but the piece will also convey an impression about the person who carries it.

In today's high-tech and increasingly ever-connected world, smartphones have become almost a necessity. Rarely, if ever, will one leave home without her phone. Yet, despite their convenience, smartphone users need a place to store their phone when it is not in use. For men, this is usually their pockets. However, many women's clothes, including many pants, dresses and skirts, simply do not have pockets large enough to store a smartphone. Furthermore, many women do not like to place their phone in their pockets, even when they are large enough, as this creates an unflattering bulge. As a result women tend to carry their phones in a separate purse, handbag, or other carrier.

One problem with placing a phone in a handbag, is that the phone is not easily accessible. The phone must first be taken out of the handbag before texts can be read, calls answered or pictures taken. Not only is this a hassle, but important photos can be missed in the time it takes to remove the phone from the handbag.

Furthermore, in certain circumstances it is perceived as rude to be checking one's phone. When a phone is in a handbag, it is hard to nonchalantly glance at the phone to see if any new calls or messages have been received.

Unlike conventional handbags that only provide a place to store a smartphone when it is not in use, the present clutch case allows the phone to quickly be used, while still being held in the case. It also allows the phone to be seen by others. This can be important to some, because, like automobiles and watches, the type of phone one owns can make a statement about them.

One can also imagine phone designers creating applications to display when the phone is attached to the exterior of a clutch case. This would allow the owner of the clutch case to match the look of the case with what she is wearing.

SUMMARY OF THE INVENTION

A clutch case comprises a pair of clamshell members hinged together at a bottom edge thereof such that the members when closed form an interior chamber for containing objects, such as lipstick, credit cards, and keys, and when open provides access to the interior chamber.

A smartphone mounting plate is hinged together with one of the clamshell members. The mounting plate is configured to hold a smartphone, while allowing a user to manipulate its touch screen and at least some of its buttons.

The inner surface of the smartphone mounting plate can be covered with a material, such as felt, to help prevent the back surface of the smartphone from becoming scratched.

In one embodiment, the mounting plate contains an opening for the camera lens of the smartphone. In this way the mounting plate can quickly be flipped up, and the smartphone can be used to take a picture.

The clutch case can further include a clasp for retaining the clamshell members in a joined position such that the objects are securely retained within the interior chamber. The clasp can be mounted on one of the clamshell members by a hinge, and is detachably securable to a retaining member mounted on the other of the clamshell members. The clasp can be maintained in a normally closed position by a resilient member interposed between the clasp and the one of the clamshell members. One type of resilient member is a spring.

In another embodiment, each of the clamshell members comprises a major planar surface and at least one side wall extending perpendicularly from the surface toward the other of the clamshell members. At least one solid bar preferably extends between portions of the at least one side wall to divide the interior chamber into a plurality of minor interior chambers.

BRIEF DESCRIPTION OF THE DRAWINGS

FIG. 4 is a top view of the clutch case illustrated in FIG. 1 in the closed position.

FIG. 5 is a bottom view of the clutch case illustrated in FIG. 1 in the closed position.

FIG. 7A is a cross-sectional view taken in the direction of arrows 7A-7A in FIG. 7. FIG. 7B is a cross-sectional view taken in the direction of arrows 7B-7B in FIG. 7. FIG. 7C is a cross-sectional view taken in the direction of arrows 7C-7C in FIG. 7.

DETAILED DESCRIPTION OF PREFERRED EMBODIMENT(S)

Figure 1:
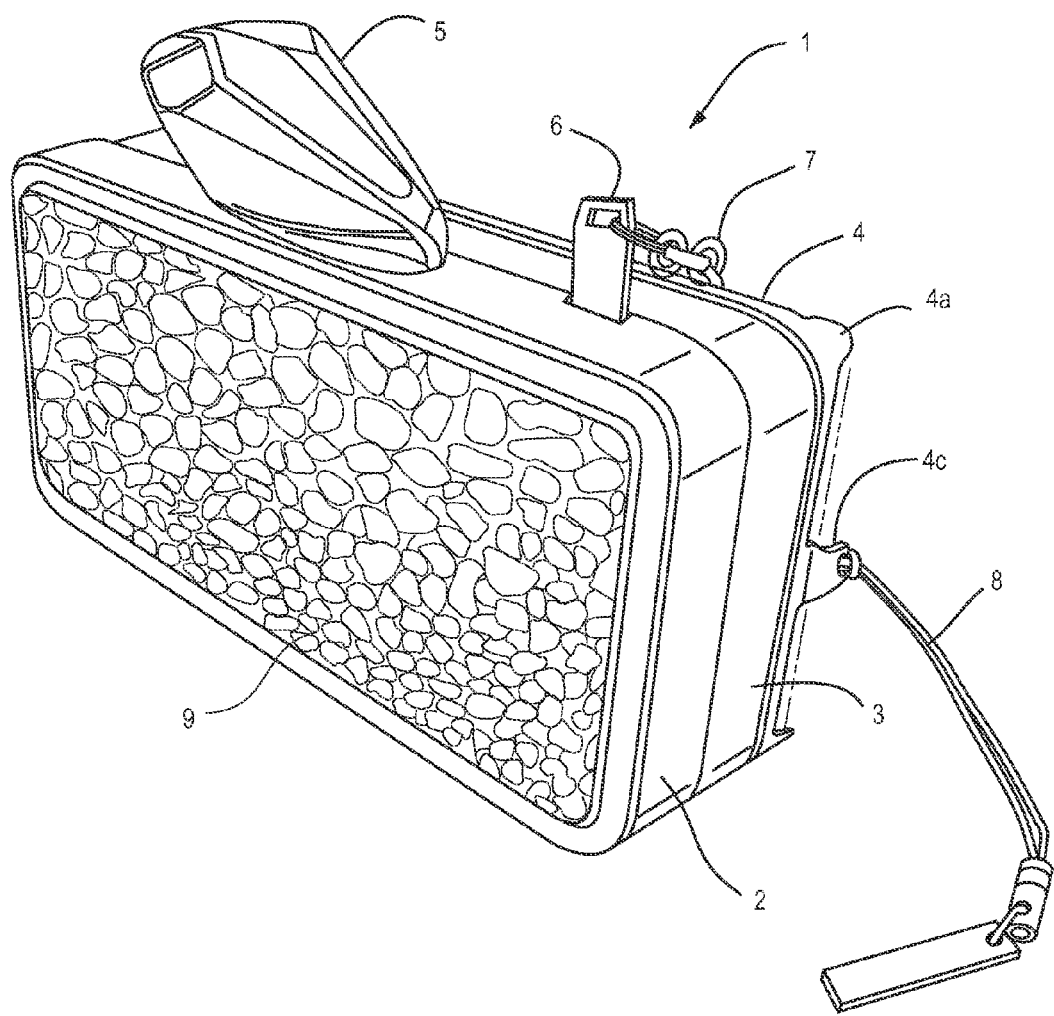
FIG. 1 is a perspective view of a preferred embodiment of a clutch case with an outer mounting plate configured to hold a smartphone.
Figure 3:
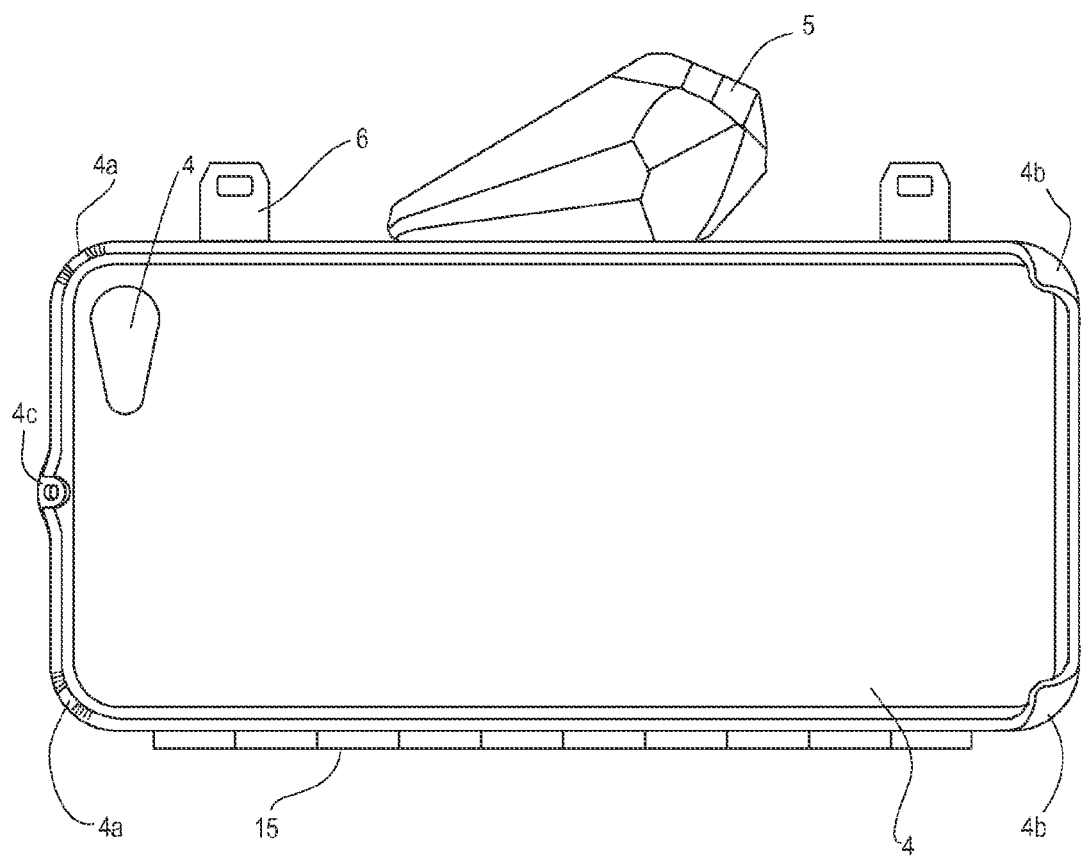
FIG. 3 is a front view of the clutch case illustrated in FIG. 1 in the closed position.

Turning first to FIG. 1, a preferred embodiment of a clutch case 1 includes a pair of clamshell members 2, 3 hinged together at a bottom edge thereof by a hinge (see hinge 15 in FIG. 3). Clamshell member 2 includes an exterior panel 9 having optional design features formed on its surface, one of which is shown in FIG. 1 as a simulated snake skin coating. Similarly, clamshell member 3 includes an exterior panel (not shown) having optional design features formed on its surface.

Clutch case 1 also includes a smartphone mounting plate 4 that is hinged to clamshell member 3 by a bottom hinge 16. Smartphone mounting plate 4 is configured to hold a smartphone with the smartphone's touch screen facing out from clutch case. This allows a user to operate the smartphone without removing it from smartphone mounting plate 4. It also allows a user to display a certain image and/or movie on her smartphone's screen so that others can see the image and/or movie when the user carries the clutch case. In this way, the clutch case can be personalized and coordinated to the event the user is attending and/or her outfit. For example, a user carrying the clutch case to a sporting event can set her smartphone to display the team's mascot. In another example, a celebrity attending a movie premier can configure her phone to play clips from the film.

Figure 6:
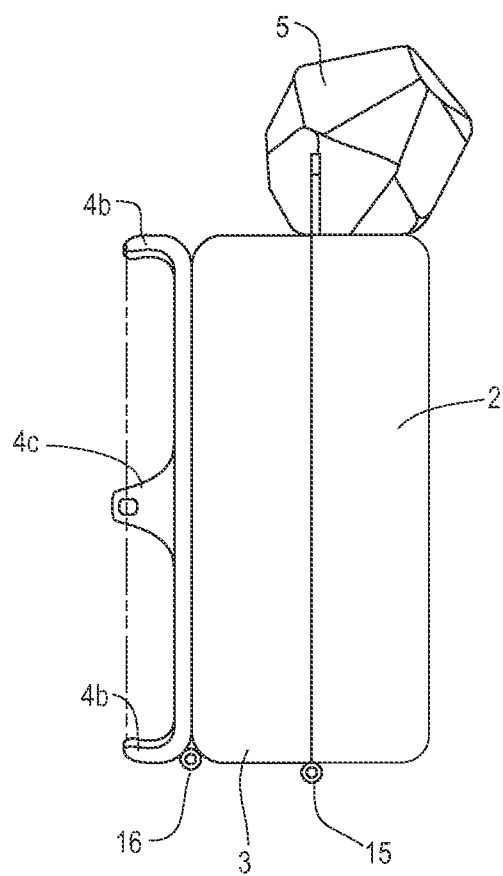
FIG. 6 is a side view of the clutch case illustrated in FIG. 1 in the closed position.

Smartphone mounting plate 4 can also be configured to allow a user to access any buttons located on the sides bottom or top of the smartphone, while it is still in smartphone mounting plate 4. This feature is best illustrated in FIG. 6 showing a side view of smartphone mounting plate 4.

As best shown in FIGS. 3-6, a pair of smartphone retaining prongs 4*a* extend substantially perpendicularly from one end of smartphone mounting plate 4. A pair of inwardly curled smartphone retaining prongs 4*b* extend from the corners at the opposite end of smartphone mounting plate 4. As shown in FIG. 3, an inwardly curled resilient middle prong 4*c* also extends from the edge of smartphone mounting plate 4 at which perpendicular prongs 4*a* extend. Inwardly curled prongs 4*b* retain a smartphone against mounting plate 4 and also impede the smartphone from lateral movement. In the illustrated embodiment, perpendicular prongs 4*a* simply impede a smartphone mounted on mounting plate 4 from lateral movement.

Like inwardly curled prongs 4*b*, inwardly curled resilient middle prong 4*c* retains the smartphone against mounting plate 4. As shown in FIG. 1, a cord 8 is attached at one end to middle prong 4*c* and has at the other end a fob or some other item that can be gripped and pulled to lift middle prong 4*c* in a direction away from mounting plate 4. When mounting a smartphone, cord 8 is pulled to lift middle prong 4*c* enough to slip the smartphone under middle prong 4*c*. Once slipped under middle prong 4*c*, cord 8 is released to permit middle prong 4*c* to return to its normal position to retain the smartphone against mounting plate 4.

Figure 2:
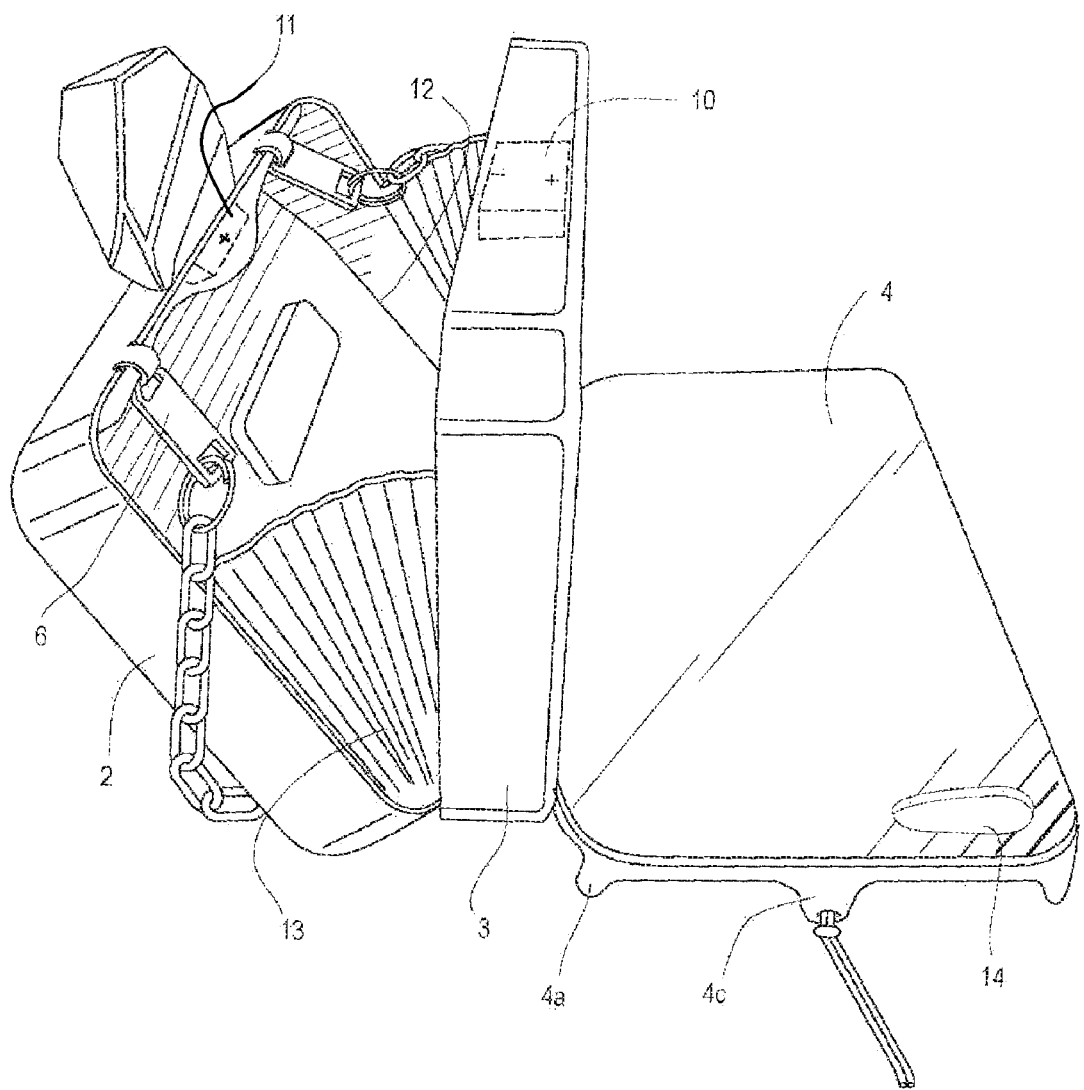
FIG. 2 is a perspective view of the clutch case illustrated in FIG. 1 in the opened position.

As shown in FIGS. 2 and 3, smartphone mounting plate 4 has a camera lens opening 14 configured to align with the lens of the smartphone when the smartphone is mounted on smartphone mounting plate 4. Camera lens opening 14, along with bottom hinge 16, allows a user to take photographs using the smartphone while it is still mounted on mounting plate 4.

Clutch case 1 may also include a strap 7. Strap 7 allows the clutch case to be used as a small hand bag. Some users may find it easier to carry clutch case 1 by strap 7. For example, strap 7 allows clutch case 1 to be hung over the user's shoulder, thereby freeing up the user's hands. In some embodiments, strap 7 can be removable, thereby providing the option of carrying a strapless clutch case. In one embodiment, strap 7 can be attached via strap clips 6, which can be clipped to the interior of the case when not in use (see FIG. 2).

Clutch case 1 can also include a clasp 5. In the illustrated embodiment, clasp 5 has a plurality of beveled or faceted surfaces such that clasp 5 resembles a jewel or precious stone. Clasp 5 makes it easier to open clutch case 1 from its closed position, as well as adding a decorative element to clutch case 1.

When clutch case 1 is in the closed position shown in FIG. 1, clamshell members 2 and 3 are retained in the closed position by two magnets 10 and 11 (see FIG. 2), although other closing mechanisms maybe also used. Magnet 10 can also be used to keep smartphone mounting plate 4 laying flat against clamshell member 3 as seen in FIGS. 1 and 4-6.

FIG. 2 illustrates clutch case 1 in an open position. Clamshell members 2, 3 and two flexible sidewalls 13 which connect clamshell members 2 and 3 together to form an interior chamber or compartment 12. The interior compartment can receive and securely contain personal objects or items such as keys, cosmetics, a wallet, credit cards, and the like. FIG. 2 further illustrates strap clips 6 as being clipped to two flexible sidewalls 13.

Figure 7:
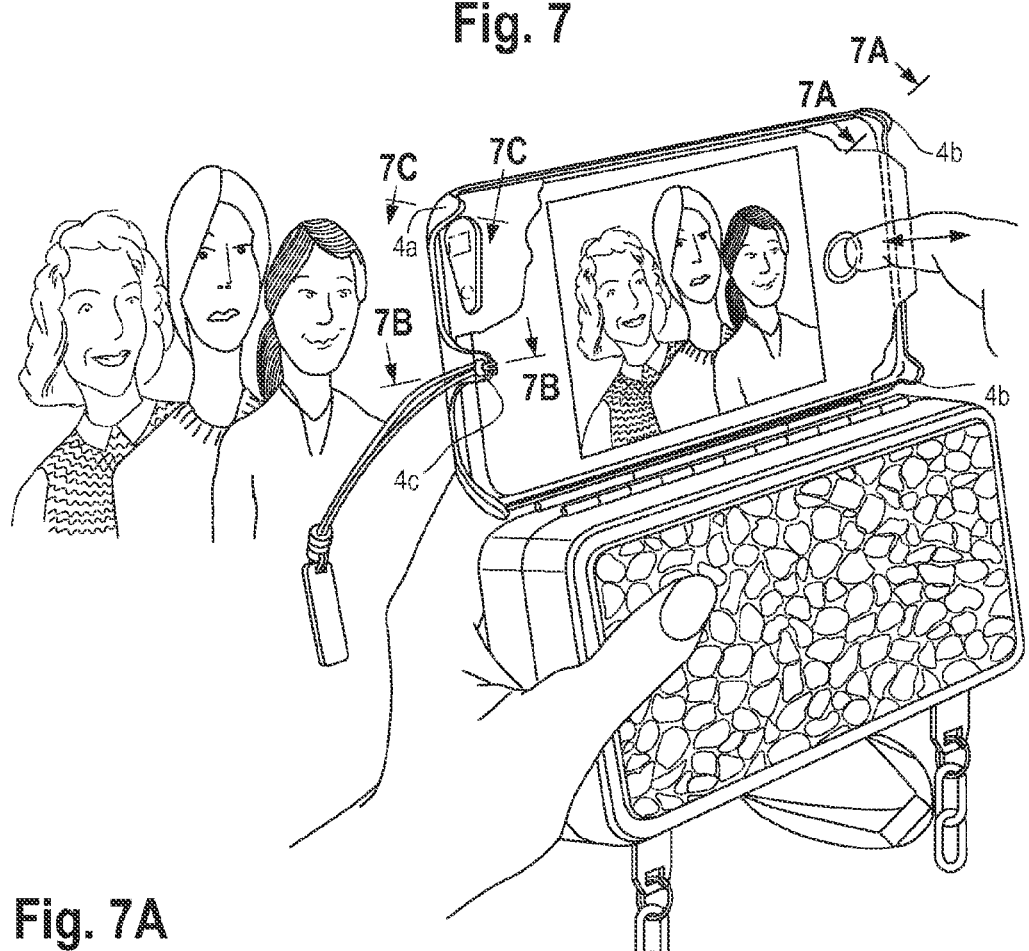
FIG. 7 is a diagram showing the use of a smartphone mounted in the present clutch case to take a photograph.
Figure 7A:
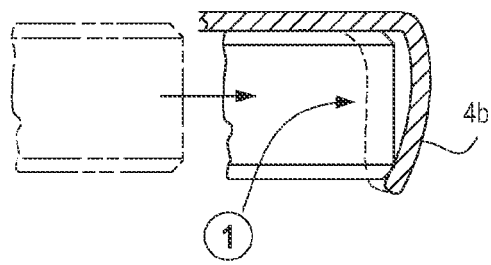
FIGS. 7A-7C depict the sequence of steps for mounting a smartphone in the smartphone mounting plate of the present clutch case.
Figure 7B:
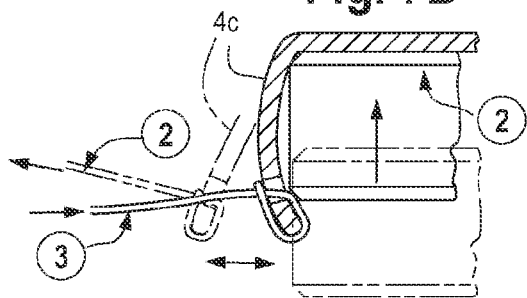
Figure 7C:
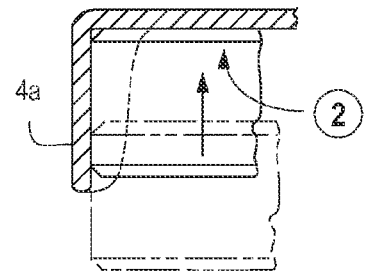

FIG. 7 shows the use of a smartphone mounted on the mounting plate of the present clutch case to take a photograph. FIG. 7A is a cross-sectional view taken in the direction of arrows 7A-7A in FIG. 7. FIG. 7B is a cross-sectional view taken in the direction of arrows 7B-7B in FIG. 7. FIG. 7C is a cross-sectional view taken in the direction of arrows 7C-7C in FIG. 7.

FIGS. 7A-7C also illustrate the steps of mounting of a smartphone. In step ① shown in FIG. 7A, one end of the smartphone is inserted into inwardly curved prongs 4*b*. In step ② shown in FIG. 7C, the other end of the smartphone is inserted into perpendicular prongs 4*a*. During the same step ②, and as shown in FIG. 7B, middle prong 4*c* is lifted enough to slip the smartphone underneath middle prong 4*c*. In step ③ shown in FIG. 7B, middle prong 4*c* is released to return middle prong 4*c* to its normal position, in which the smartphone is retained against the mounting plate of the clutch case.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A clutch case comprising:
    (a) a pair of clamshell members hinged together at a bottom edge thereof such that said members when closed form an interior chamber for containing objects and when open provide access to said interior chamber;
    (b) a smartphone mounting plate hinged together with one of the clamshell members at the bottom edge, said smartphone comprising a housing having peripheral edges and a pair of oppositely disposed major planar surfaces, one of said major planar surfaces having a touch screen disposed thereon, said mounting plate comprising:
        (i) a plurality of curled resilient grasping prongs extending from said mounting plate, said grasping prongs capable of engaging a smartphone housing peripheral edge, thereby removably securing said smartphone housing to said mounting plate such that said touch screen is externally visible;
        (ii) a curled resilient releasing prong extending from said mounting plate, said releasing prong, when in a closed position, securing said smartphone housing to said mounting plate, and, when in an open position, permitting said smartphone housing to be separated from said mounting plate.

2. The clutch case of claim 1, further comprising a closing mechanism for retaining said clamshell members in a joined position such that said objects are securely retained within said interior chamber.

3. The clutch case of claim 2, wherein said closing mechanism comprises a pair of joinable closure elements, one of said closure elements mounted on one of said clamshell members and the other of said closure elements mounted on the other of said clamshell members, said closure elements when joined maintain said clamshell members in a closed position and when separated release said clamshell members into an open position.

4. The clutch case of claim 3, wherein said closure elements are magnets with facing surfaces having opposite polarities.

5. The clutch case of claim 1, wherein each of said clamshell members comprises a major planar surface and at least one side wall extending perpendicularly from said surface toward the other of said clamshell members.

6. The clutch case of claim 1, wherein said smartphone mounting plate is configured to allow use of the touch screen of a smartphone when said smartphone housing is secured on said mounting plate.

7. The clutch case of claim 1, wherein said smartphone has a plurality of side buttons projecting from said smartphone housing on aside of said housing interconnecting said pair of oppositely disposed major planar surfaces, said mounting plate configured to allow actuation of said side buttons when said smartphone housing is secured on said mounting plate.

8. The clutch case of claim 1, wherein said smartphone has a camera lens opening formed on said housing major planar surface opposite said housing major planar surface having said touch screen disposed thereon, said mounting plate having an opening formed therein that aligns with said camera lens opening when said smartphone housing is secured on said mounting plate.

\* \* \* \* \*